United States Patent [19]

Erbs et al.

[11] Patent Number: 4,748,822

[45] Date of Patent: Jun. 7, 1988

[54] SPEED CONTROL OF A VARIABLE SPEED AIR CONDITIONING SYSTEM

[75] Inventors: Daryl G. Erbs, Canastota; Michael J. Brandemuehl, Syracuse, both of N.Y.

[73] Assignee: Carrier Corporation, Syracuse, N.Y.

[21] Appl. No.: 938,103

[22] Filed: Dec. 4, 1986

[51] Int. Cl.$^4$ ................................................ F24F 3/00
[52] U.S. Cl. ...................................... 62/213; 62/228.4; 165/22
[58] Field of Search ...................... 62/228.4, 180, 213; 165/16, 22; 236/1 EA, 49 D

[56] References Cited

U.S. PATENT DOCUMENTS

| | | | |
|---|---|---|---|
| 3,482,623 | 12/1969 | Betz | 165/22 |
| 3,568,760 | 3/1971 | Hogel | 165/22 |
| 3,653,589 | 4/1972 | McGrath | 236/49 D |
| 4,364,237 | 12/1982 | Cooper et al. | 62/228.4 X |
| 4,407,139 | 10/1983 | Ide et al. | 62/228.4 X |

Primary Examiner—William E. Wayner
Attorney, Agent, or Firm—Dana F. Bigelow

[57] ABSTRACT

Provision is made in a multiple zone air conditioning system for varying the speed of the compressor to match the load thereon. The differences between the actual temperatures and the set points in the individual zones are monitored and the largest of these differences is periodically selected and applied to a transfer function to obtain a new speed at which the compressor is run. At the same time, the individual dampers within the zones are modulated in response to their respective sensed temperature differences. Provision is also made to vary the speed of the indoor fan in a similar manner.

14 Claims, 3 Drawing Sheets

SPEED CONTROL OF A VARIABLE SPEED AIR CONDITIONING SYSTEM

BACKGROUND OF THE INVENTION

This invention relates generally to the control of heat pump and air conditioning systems and, more particularly, to speed control of a variable speed compressor in a multiple zone air conditioning system. A basic air conditioning system of the type usually found in residences comprises a heating/cooling unit which is controlled by a single thermostat to provide a constant volume of heating or cooling air during periods when the room temperature differs from the thermostat set point by a predetermined amount. Such a system has been found unsuitable for larger buildings where there are multiple use areas with different mode requirements. To accommodate these requirements, a multiple zone system was introduced and is now common in the industry. Such a multiple zone system has multiple thermostats, with each thermostat controlling the flow of cooling/heating air to its particular zone.

One type of multiple zone system is that known as the VVT (variable volume and temperature) system which is commercially available from Parker Electronics Inc. This system, which is described in U.S. Pat. No. 4,530,395 issued to Jeffrey L. Parker et al. on July 23, 1985 and is incorporated herein by reference, includes a microcomputer based thermostat and damper assemblies to modulate the air flows and temperatures to maintain the desired amounts of air flow to the respective zones. Such a system is designed to operate with a single speed compressor whose capacity is greater than any anticipated load such that it is usually operating in an oversized condition. Initially, the individual zone dampers are all in the fully opened position, but as the zone temperatures get closer to the respective thermostat set points, their respective dampers begin to modulate to the closed positions. Accordingly, in those zones where the set point temperatures have been met, the dampers will be closed, whereas in the other zones, the dampers will either be fully opened or will be in the process of modulating toward the closed position. In order that proper air flow is maintained, there will always be one damper which remains fully opened; but the remaining dampers will eventually close and finally the system will shut off when all of the thermostat set points have been met. It will thus be seen that the dampers tend to operate primarily in the fully opened or fully closed positions, with the period of modulation between those extreme positions being limited to relatively small periods of time.

It is therefore an object of the present invention to provide an improved air conditioning temperature control system.

Another object of the present invention is the provision in an air conditioning system for more closely matching the capacity of the system with the existing load thereon.

Still another object of the present invention is the provision in a multizone air conditioning system for maintaining control of the air flow to the zones for a greater percentage of time.

Yet another object of the present invention is the provision for an air conditioning control system which is very functional in use and economical to manufacture and operate.

These objects and other features and advantages become more readily apparent upon reference to the following description when taken in conjunction with the appended drawings.

SUMMARY OF THE INVENTION

Briefly, in accordance with one aspect of the invention, a multizone air conditioning system is provided with a variable speed motor to drive the compressor, with the speed of the motor being modulated in response to the existing load as determined by the differences between the thermostat set points and the room temperatures in the various zones.

In accordance with another aspect of the invention, the speed of the variable speed motor is varied in response to the highest temperature difference existing in any one of the zones, with the temperature difference being that difference between the thermostat set point and the room temperature of that zone. In this way, the compressor can be run substantially continuously at relatively low speeds such that the capacity of the system is substantially matched with the load. The system is therefore able to operate within a relatively narrow range to provide improved control and performance efficiency characteristics.

By yet another aspect of the invention, the narrow range of operation is chosen to coincide with the modulation range of the zone dampers such that the time in which the dampers are in their modulating positions is substantially increased and the operational time in which the dampers are in the fully opened or fully closed positions is substantially decreased. This again provides for more precise control of the air flow to the individual zones. In the drawings hereinafter described, a preferred embodiment is depicted: however, various other modifications and alternate constructions can be made thereto without departing from the true spirit and scope of the invention.

DESCRIPTION OF THE PREFERRED EMBODIMENT

Figure 1:
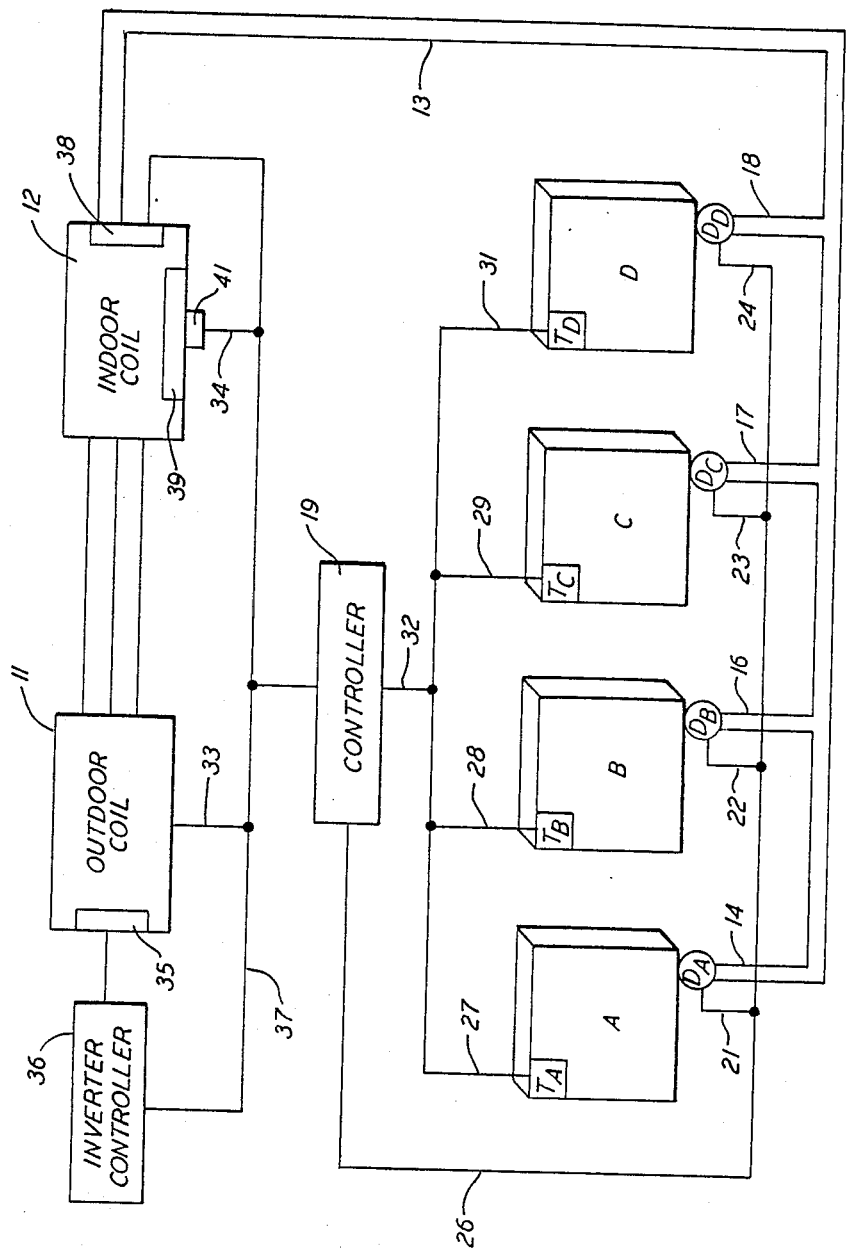
FIG. 1 is a schematic illustration of a multiple zone system having the present invention incorporated therein.

Referring now to FIG. 1, a multiple zone heat pump system is shown to include an outdoor coil 11, an indoor coil 12, and a duct 13 which provides heating and/or cooling air to a plurality of zones designated as A, B, C and D by way of individual ducts, 14, 16, 17 and 18. Because of the difference in heating/cooling requirements to the various zones, the air flow to those zones is individually modulated by dampers designated as $D_A$, $D_B$, $D_C$ and $D_D$. These dampers are thus placed in the flow path of the individual ducts 14, 16, 17 and 18 and are controlled in response to electrical signals received from a system controller 19 by way of electrical leads 21, 22, 23, and 24, respectively.

In addition to the capability described hereinabove wherein the individual zones A, B, C and D are capable of variable air delivery volumes to meet the particular requirements of the zones, the zones also have means to individually set the demand levels and sense the existing conditions by way of the individual thermostats $T_A$, $T_B$, $T_C$, and $T_D$ as shown. These thermostats communicate with the controller 19 by way of electrical leads 27, 28, 29 and 31 and the common lead 32.

The controller 19 is connected to the outdoor coil 11 and the indoor coil 12 by electrical leads 33 and 34, respectively. Signals are sent from the controller 19 to those coils for the purposes of: (1) controlling the respective expansion valves, (2) controlling the respective fan motors, and (3) controlling the reversing valve when changing between the cooling and heating modes. The leads 33 and 34 also provide certain feedback signals to the controller 19, such as sensed temperature conditions and sensed motor operating conditions.

The present invention relates to an air conditioning system having variable speed capabilities. In general, this means that the compressor 35, located in the outdoor coil 11, can be operated over a range of speeds, with the speed at any one time being matched to the load requirement at that time. This variable speed capability can be provided in any number of ways. For example, an electrically commutated motor (ECM) can be used to drive the compressor, with the duty cycle thereof being modulated to obtain the variable speed operating characteristics desired. Another possibility, is that of using an inverter controller 36 as shown in FIG. 1 to modulate the duty cycle input in such a way as to obtain the desired speed within a prescribed range. The inverter controller 36 communicates with the controller 19 by way of electrical lead 37 and its input is applied directly to an AC induction motor for driving the compressor 35. The particular manner in which speed changes are effected will be described hereinafter.

It should be understood that the present invention is applicable to any system that conditions air, i.e., a cooling only system, a heating only system or a heat pump system. But for purposes of fully disclosing the relevant aspects of the invention, it will be described herein as applied to a heat pump system. It is, of course, common in a heat pump system to provide in combination therewith a supplementary heating system such as a bank of electrical resistance strip heaters 38 which operate in combination with the indoor fan or blower 39 to provide heated air to the main duct 13. An alternate approach, of course, is to combine the indoor coil with a furnace, in which case the furnace would have its own blower that is driven by a variable speed motor. The variable speed control feature of the present invention is therefore applicable not only to the compressor 35 and the indoor fan 39, but also to the blower motor of a hot air furnace.

Figure 2:
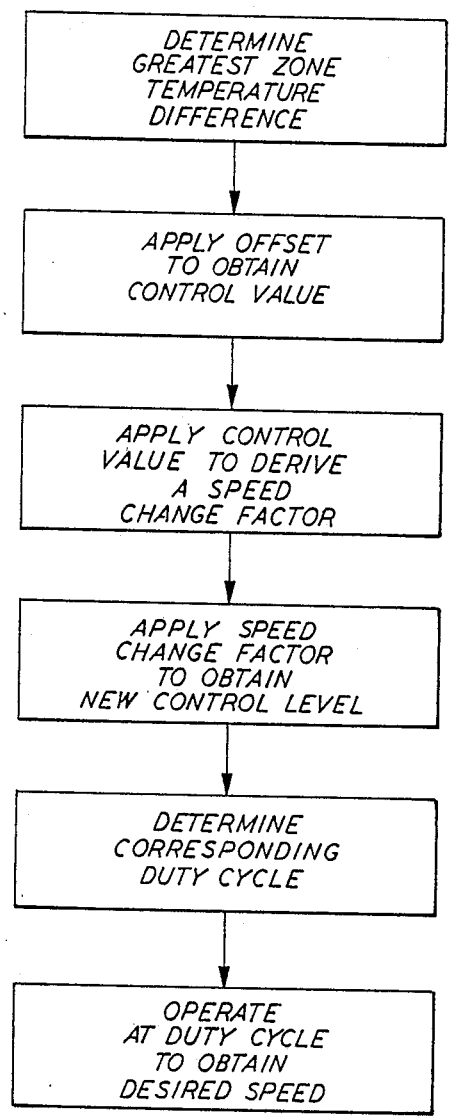
FIG. 2 is a flow diagram showing the sequence of steps in the method of the present invention.

Referring now to FIG. 2, the methodology of the speed control system of the present invention will now be described. Recognizing that when the system is in the operating condition, there will normally exist in each of the zones A, B, C and D, a temperature difference between the set point and the actual sensed temperatures at the respect thermostat $T_A$, $T_B$, $T_C$ and $T_D$. In accordance with the present invention, the controlling difference for use in speed control is the greatest of these differences. That is, the zone with the greatest difference between its set point and its actual sensed temperature will be the zone whose temperature difference controls the speed of the system. The damper D within that zone will thus remain in a fully open position during the period in which that zone is controlling, with the flow of air to the remaining zones being controlled by their respective dampers operating in their modulating modes. If, in the meantime, the temperature difference in the controlling zone should decrease to a level below the temperature difference in one of the other zones, the other zone will then become the controlling zone, and its temperature difference will be used to determine the speed of the system.

To enhance the degree of control within each of the zones, it is desirable that the dampers $D_A$, $D_B$, $D_C$ and $D_D$ remain in their proportional band for modulation, i.e., neither in their fully open nor fully closed positions, but rather in their intermediate modulating positions. Accordingly, the temperature difference within the controlling zone is offset by 1° F., with the resulting difference then being used as the Control Value. For purposes of reliability, the temperature difference in each of the zones is calculated once every 20 seconds and is averaged over a period of two minutes. Thus, every two minutes the averaged differences in each of the zones A, B, C and D are compared and the largest difference is selected for use in the speed control algorithm.

The Control Value as determined by the controller 19 represents a call for a percentage of full system capacity or a Control Level. This Control Level signal is passed from the controller to the inverter controller 36 where a proportional integral (PI) control operates to convert the Control Level to a related duty cycle which in turn determines the speed of the compressor 35. This relationship is shown graphically in FIG. 3 wherein for each of the inverter control frequencies, 84 hertz (cooling) and 90 hertz (heating), a particular duty cycle and related compressor speed can be obtained as a function of the capacity percentage or Control Level signal received from the controller 19. It should be recognized that the proportional integral control does not provide control over the continuous range of Control Levels, but rather at 16 discrete levels indicated on the graphic ordinate of FIG. 3. Thus, for a given Control Level demand, the closest of those 16 points will be applied to determine the duty cycle and thus the compressor speed. The manner in which the Control Value from the controller 19 is translated to the desired Control Level will now be described. As mentioned hereinabove, the Control Value, as determined from the individual zones A, B, C and D, is updated every two minutes. A speed change factor is then calculated each time on the basis of the following formula:

Speed Change Factor = $PCNST(CV_2 - CV_1) + ICNST(CV_2)$     (Eq. 1)

Where
    PCNST is the Proportional Gain Factor in %/F.
    $CV_1$ is the previous Control Value.
    $CV_2$ is the updated Control Value.
    ICNST is the Integral Control Action Constant in %F.

Figure 3:
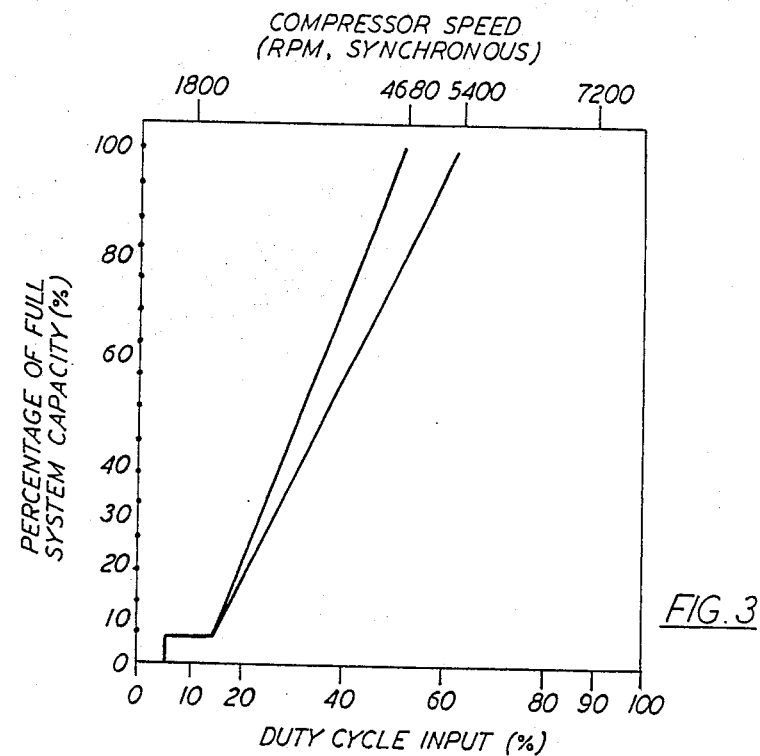
FIG. 3 is a graphic illustration of the inverter frequency control characteristics.

The Speed Change Factor obtained from the above formula is then added to the old Capacity Percentage or Control Level to obtain the updated Control Level. That updated Control Level is then applied to the lookup table as shown in FIG. 3 to obtain the updated duty cycle and compressor speed.

When the speed of the compressor 35 is changed, it is also desirable to change the speed of the indoor fan or blower 39. Generally, the fan speed will be proportional to the compressor speed. However, the fan speed is not controlled as a direct function of the compressor speed but rather as a function of the updated Control Value at the controller 19. This is accomplished in a manner similar to that described for the compressor speed hereinabove. Again, the old and new Control Values are applied to Equation 1 above, with the proportional gain factor, PCNST, and integral control action constant, ICNST, being selected as appropriate for the particular proportional integral control. The speed change is again applied to the existing Control Level to obtain a new Control Level which is then applied to obtain the transfer function by way of a lookup table similar to that in FIG. 3 to obtain the new duty cycle and fan motor speed.

Having discussed the manner in which the variable speed feature is controlled, it may be well to discuss various related operational conditions. When the system first comes on line, (i.e., when the largest temperature difference in any one zone is 1° F. or greater) the compressor will turn on at a selected minimum speed (i.e., 6 percent) of the full system capacity as shown in FIG. 3. Although the control values will begin to be updated every two minutes, speed changes will be inhibited for a prescribed period of time (e.g., eight minutes). The purpose of this delay is to allow the inverse response characteristics of the system, which result from cold ducts, air stratification, etc. to die out. Control is improved by avoiding any control action during this transient period.

At the end of the delay, the speed is then adjusted using the most recent Control Values in the manner described hereinabove. The system will then operate continuously, with speed changes being updated every two minutes, until the Control Value is reduced to zero.

Where the change in Control Values over a two minute period exceeds a predetermined value (e.g., 12° F.), it is assumed that a sudden change in set point has occurred and the PI equation is allowed to increase the capacity to 100 percent for a prescribed period of time. After the delay, the PI equation is allowed to adjust the capacity again from the value of 100 percent. If the capacity after the second adjustment is 130 percent or larger, the value of ICNST is reset to a lower value and strip heat is allowed to cycle on. This is continued until the capacity drops to less than 100 percent whereupon the ICNST is reset to its initial level.

Speed changes are also inhibited for a prescribed period of time following the use of strip heat and also after a defrost. The speed following defrost is set to the same level as before the defrost was initiated.

Figure 4:
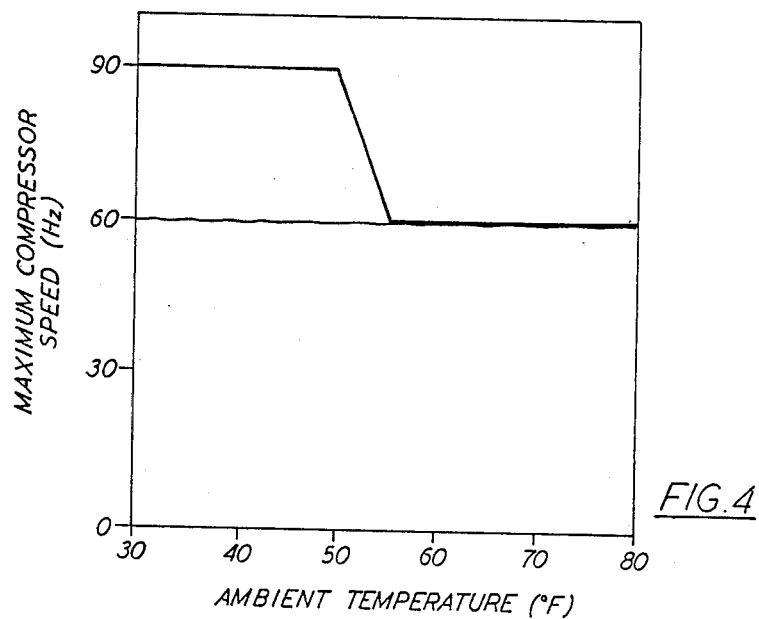
FIG. 4 is graphic illustration of the speed limit function.

The strip heater 38 is controlled from the same Control Value as is the compressor 35 and the blower 39. The duty cycle of the strip heater is the demand Control Level or capacity percentage, minus 100 percent, and the strip heat duty cycle has a maximum value of 100 percent. Accordingly, as mentioned hereinabove, a capacity percentage of 130 percent will start cycling of the strip heater at a duty cycle of 30 percent, provided the unit is in the heating mode. It is quite possible with the above-described system that, even though the ambient temperature conditions are moderate, one of the zones will have a temperature difference great enough to cause the compressor to operate at a maximum speed. To prevent this condition, a speed limit function is provided as shown in FIG. 4. Thus, when the ambient temperature is between 50° and 75°, the controller will limit the compressor speed as shown. This is true in either the heating or cooling modes of operation.

It will be understood that the present invention has been described in terms of a preferred embodiment, but it may take on any number of other forms while remaining within the scope and intent of the invention. For example, although it has been described in terms of a ducted system having individual ducts and dampers to each zone, it may also be applied to a multiple zone system having individual indoor coils with a common outdoor coil.

What is claimed is:

1. In a multizone air conditioning system of the type having outdoor and indoor coils, a variable speed compressor which operates in response to a control module, and individual thermostats located in the zones and electrically connected to the control module, a method of controlling the compressor speed comprising the steps of:

monitoring the actual temperatures in the zones and comparing them with respective thermostat set points to obtain temperature differences;

periodically selecting the largest of the temperature differences; and adjusting the compresosr speed in response to said largest temperature differences in accordane with the following equation:

$$\text{Speed Change Factor} = \text{Proportional Gain Factor} \times (\text{Previous largest temperature difference} - \text{existing largest temperature difference}) + ICNST \times (\text{existing largest temperature difference})$$

Where
PCNST = PRoportional Gain Factor and
ICNST = Integral Control Action Constant.

2. The method as set forth in claim 1 wherein said system includes ducts which fluidly interconnect the indoor coil with the zones with said ducts having dampers therein, and further including the step of modulating said dampers in response to said temperature differences.

3. The method as set forth in claim 1 wherein said adjusting step includes the step of adding an offset to said largest of the temperature differences.

4. The method as set forth in claim 1 wherein said step of adjusting the compressor speed includes a step wherein a percentage of full system capacity is determined as a function of said largest temperature difference.

5. The method as set forth in claim 1 wherein said step of adjusting the compressor speed includes the step of determining an operating duty cycle as a function of said largest temperature difference.

6. The method as set forth in claim 1 wherein said compressor speed adjusting step is accomplished with the use of a proportional integral control.

7. In an air conditioning system of the type having a variable speed motor and individual zone thermostats, a method of controlling the motor speed comprising the steps of:

sensing the actual temperatures in each of the zones and comparing them with their associated thermostate set points to obtain respective temperature differences;

comparing said temperature differences and selecting the largest one to be applied as a control valve;

converting said control value to a desired Speed Change Factor by use of a predetermined transfer function as follows:

Speed Change Factor = $PCNST \times$ (existing control value − previous control value) + $ICNST \times$ (existing control value)

Where
PCNST = Proportional Gain Factor and
ICNST = Integral Control Action Constant,
and, applying said Speed Change Factor to operate said variable speed motor at a desired speed.

8. A method as set forth in claim 7 wherein said steps are periodically applied to update and change the motor operating speed.

9. A method as set forth in claim 7 wherein said air conditioning system includes outdoor and indoor coils and a compressor which is driven by said variable speed motor, and further wherein said compressor is operated on a variable speed basis.

10. The method as set forth in claim 7 wherein said air conditioning system includes a fan which is driven by said variable speed motor.

11. The method as set forth in claim 7 wherein said step of obtaining a control value includes the step of adding an offset to said largest temperature difference.

12. The method as set forth in claim 7 and including an initial step of storing a lookup table for performing the step of converting said control value to a desired speed.

13. An improved multiple zone air conditioning system of the type having individual zone thermostats, a variable speed compressor and a variable speed fan for circulating air to the individual zones comprising:

menas for determining the differences between the individula zone temperatures and their associated thermostat set points;

means for comparing said individual zone temperature differences and selecting the largest thereof;

means for applying said largest temperature difference to obtain a representative desired speed;

control means for maintaining the speed of the fan at said desired speed;

means for applying said largest temperature difference to obtain a representative desired compressor speed; and control means for maintaining the speed of the compressor at said desired speed.

14. An air conditioning system as set forth in claim 13 and including individual air flow ducts and associated dampers, and further including control means for modulating said dampers as a function of said temperature differences.

* * * * *